United States Patent [19]

Chang

[11] Patent Number: 5,308,821
[45] Date of Patent: May 3, 1994

[54] PACKING ADSORBENT PARTICLES FOR STORAGE OF NATURAL GAS

[75] Inventor: Chin-Hsiung Chang, Palatine, Ill.

[73] Assignee: Allied-Signal Inc., Morris Township, Morris County, N.J.

[21] Appl. No.: 906,993

[22] Filed: Jul. 1, 1992

[51] Int. Cl.$^5$ .......................... B01J 21/18; B01J 20/00
[52] U.S. Cl. .................................. 502/180; 502/400; 502/416
[58] Field of Search .................. 502/180, 400, 416

[56] References Cited

U.S. PATENT DOCUMENTS

| | | | |
|---|---|---|---|
| 4,495,900 | 1/1985 | Stockmeyer | 123/1 A |
| 4,820,681 | 4/1989 | Chang et al. | 502/416 |
| 4,855,123 | 8/1989 | Suzuki et al. | 502/180 |
| 4,972,658 | 11/1990 | Greenbank | 502/416 |
| 5,094,736 | 3/1992 | Greenbank | 502/416 |

FOREIGN PATENT DOCUMENTS 3-254834 11/1991 Japan.
4-12012 1/1992 Japan.

OTHER PUBLICATIONS

S. S. Barton et al., "The Development of Adsorbent Carbon for the Storage of Compressed Natural Gas." Ministry of Transportation and Communications, Government of Ontario, Jun. 1985, Report No. AF-85-01, pp. 1-7.

*Primary Examiner*—Patrick P. Garvin
*Assistant Examiner*—E. D. Irzinski
*Attorney, Agent, or Firm*—Harold N. Wells; Mary Jo Boldingh; Roger H. Criss

[57] ABSTRACT

The ability of a packed bed of adsorbent to hold a gas is increased by employing at least two sizes of adsorbent particles having nominal diameters differing by at least 7/1. In a preferred embodiment, the capacity of a bed of carbon molecular sieve particles for adsorption of natural gas is significantly improved.

10 Claims, No Drawings

PACKING ADSORBENT PARTICLES FOR STORAGE OF NATURAL GAS

BACKGROUND OF THE INVENTION

The invention relates to a method of storing natural gas. More particularly, the invention relates to storage of natural gas at near ambient temperatures using a solid adsorbent, in particular, a carbon molecular sieve.

Natural gas, being substantially methane, has a low molecular weight and it occupies a large volume per unit weight compared to liquid fuels. Thus, reducing the volume of natural gas is necessary for most practical applications of natural gas as a fuel. Methods for doing this could include (1) storage at high pressure, (2) liquefaction and storage at low temperatures, and (3) adsorption on solids. Of these methods the last is of particular interest since compact storage of natural gas at moderate pressures may be achieved, while avoiding the cryogenic temperatures needed for liquid natural gas or the high pressures needed for storage as a gas in reasonable volumes.

Conventional activated carbons have been found to have reasonable capacity for natural gas but higher capacity is believed necessary for commercial success. Inorganic zeolites have also been tried, but found to have relatively low capacity for natural gas.

In U.S. Pat. No. 4,820,681 the present inventor has disclosed an improved carbon molecular sieve which has a high capacity for carbon dioxide and may be characterized as hydrophobic, requires no binders, and may be carbonized in a single step.

Ideally, the carbon molecular sieve would be a solid block completely filling a container so that no void spaces are present which waste volume in the container. To obtain access to the carbon and for practical reasons it will often be used in the form of solid particles which are packed into a container. In such situations, the closest approach to completely filling the container is desired. The present invention is directed to achieve a high packing density of particulate adsorbents.

In U.S. Pat. No. 4,495,900 zeolite adsorbent is compressed to form a solid mass for use in adsorbing methane gas. In a similar method, a Saran copolymer was formed into monolithic disks capable of filling a vessel and carbonized for use in the storage of natural gas (S. S. Barton et al. "The Development of Adsorbent Carbon for the Storage of Compressed Natural Gas," Ministry of Transportation and Communications, Government of Ontario, June, 1985).

Another method of increasing packing density combines particles ranging from 4 to greater than 325 mesh, as disclosed in U.S. Pat. No. 4,972,658. Two methods are described, one of which involves first adding large particles of a particular size range and then, without disturbing the orientation of the first particles, adding smaller particles having another defined size range to fill the spaces between the large particles. Such a procedure can yield non-reproducible results owing to the wide distribution of particle size and non-uniform shape. The present inventor has sought an improved method which can provide reproducible results.

BRIEF SUMMARY OF THE INVENTION

Natural gas is stored at near ambient temperatures and at pressures of about 1400 to 4500 kPa on a carbon molecular sieve particles having a high density as packed into a container. The particles are spherical in shape or cylindrical pellets having a length to diameter ratio of about 1/1. They are graded into two or three sizes having a ratio of their diameters of at least 7/1. The smaller particles can be dispersed between the larger particles with the assistance of a means of vibration. Using the method of the invention the packing density can be increased by about 25% or more compared to the packing density of a single size particle. The large particles typically make up about 80% of the total absorbent. Owing to the uniformity and shape of the particles the bed of adsorbent can be uniformly and reproducibly packed.

DETAILED DESCRIPTION OF THE INVENTION

Carbon Molecular Sieves (CMS)

The carbon molecular sieves and activated carbons made by prior art methods using waste materials from the manufacture of Saran or other low cost feedstocks are considered inferior to the preferred adsorbent for the storage of natural gas since they have not been optimized for the desired properties. However, they could be packed into containers using the method of the invention, and obtain its advantages, if not the capacity of the preferred carbon molecular sieves.

The preferred hydrophobic carbon molecular sieves (CMS) for the adsorption of natural gas are produced by a unique method. This method comprises three steps: (1) polymerization of an oxygen-free monomer optionally in the presence of a minor amount of an oxygen-free cross-linking agent; (2) forming particles of the resultant polymer into a desired shape; and then, (3) carbonizing the shaped material in a substantially oxygen-free environment.

The monomers should be readily polymerizable, essentially free of oxygen in their molecular structure and preferably consisting of hydrogen, a halogen, and carbon. Among the materials which may be employed as the monomer are acrylonitrile (AN), vinylidene fluoride (VDF), chlorotrifluoroethylene (HALAR), vinylidene chloride (VDC), mixtures of two or more monomers such as mixtures of vinylidene chloride and vinyl chloride, vinylidene chloride and acrylonitrile, and a mixture of styrene and divinylbenzene. Other monomers which are suitable are vinyl fluoride, vinyl bromide, chlorinated ethylene, chlorofluoroethylene, vinyl chlorobenzene, vinylidene bromide and vinylidenefluoride-chlorotrifluoro-ethylene. The preferred monomer for is vinylidene chloride, most preferably without the use of a cross-linking agent.

Several methods of polymerization may be employed. Bulk polymerization is the direct conversion of liquid monomer to polymer in a reaction system in which the polymer remains soluble in its own monomer. Solution polymerization uses a solvent capable of dissolving the monomer, the polymer, and the polymerization initiator. Suspension polymerization and emulsion polymerization have also been used to produce materials having the same level of desired properties, contrary to the previous findings of U.S. Pat. No. 4,820,681. In suspension polymerization, the monomer is dispersed rather than dissolved in the medium, with water being a typical suspension medium. The initiator is dissolved in the monomer, the monomer is dispersed in water, and a dispersing agent is incorporated to stabilize the suspension formed. It is believed that precipitation polymerization and vapor phase polymerization would also be suitable.

The polymers produced in the initial polymerization step optionally may be cross-linked with a substantially oxygen-free cross-linking agent. The cross-linking agent will typically be present during the polymerization at a concentration equal to less than 10 mole percent of the monomer preferably less than 1 mol. %, and most preferably no more than about 0.2 to 0.5 mol. %. A preferred cross-linking agent is divinylbenzene. Other possible cross-linking agents include trivinyl benzene, divinyl acetylene, and divinyl sulfide.

As the production of carbon molecular sieves from polymers containing no oxygen is desired, the polymerization initiator is also preferably an oxygen-free compound. Therefore, a carbon or azo rather than an oxygen initiator is preferably used. One suitable non-oxygen containing initiator is 2,2'-azobis(isobutyronitrile), (AIBN). Another highly suitable polymerization initiator is the compound 2,2'-azobis (2,4-dimethylvaleronitrile) which is available from DuPont Chemical Company and is sold under the trade VAZO 52.

If the precursor polymer is produced by solution polymerization, a number of different solvents may be employed. Typical solvents include normal hexane, chloroform, carbon tetrachloride, orthodichlorobenzene, and 1,1,2,2-tetrachloroethane. Of these materials, orthodichlorobenzene and 1,1,2,2-tetrachloroethane are preferred. General characteristics for the selection of a solvent include a high-solubility for the monomer, the absence of oxygen in the molecular structure, and a large difference in boiling point between the solvent and the monomer. A weight ratio between monomer and solvent between 1:1 to 1:2 will normally be suitable.

When suspension or emulsion polymerization is used, the monomer is suspended or emulsified in water. The weight ratio of the monomer to the suspending fluid is about 0.1 to 1.0.

In general, granular particles or spherical beads are produced. They can be carbonized directly, however, for ease in fabricating the polymer into a desired shape, it is preferably reduced in size to small free-flowing particles, which may be shaped into a desired configuration by conventional means.

The shaped polymeric material is carbonized by heating the shaped material to a high temperature in the presence of an inert gas such as nitrogen or helium. The concentration of oxygen in the atmosphere surrounding the particles undergoing carbonization should be less than 0.1 mole percent and is preferably less than 0.05 mole percent. The carbonization will result in the evolution of a hydrogen halide. Preferably the inert gas should be flowing at a sufficient rate to remove this material from the particles. It is preferred that prior to high temperature carbonization the shaped polymer be heated above slowly in the range of 140° to 180° C. (up to about 25° C./hr) and held at this temperature for several hours. The shaped polymer is then preferably subjected to a programmed temperature increase to a temperature above 700° C. The temperature is preferably raised at a rate greater than 50° C. per hour but less than 200° C. It is preferred to hold the final temperature for a period of at least 45 minutes and preferably for at least one hour. A preferred rate of programmed heating is 75°–125° C. per hour. The highest temperature is normally required for less than 5 hours. The required holding period can be determined by weight loss measurements.

Only a single carbonization step is needed. The second carbonization step of some prior art methods is not required. The second carbonization step of the prior art is done after the product of the first carbonization has been pulverized, admixed with a binder or other material such as coal tar pitch or high carbon content material and then shaped again.

Since the sieve precursors are derived from polymeric materials and include no binders, they are substantially free of the inorganic materials such as metals and inorganic oxides which may be present when the precursor material is made from a naturally occurring substance such as coal, coconut shells, peat, or wood. Materials which contain a binder will normally have impurities derived from the binder in addition to impurities present in the precursor materials. After carbonization on a hydrogen- and oxygen-free basis, the product should contain at least 99.5 wt. % carbon and preferably at least 99.8 wt. % carbon. This measurement does not include any material applied as a surface treatment or coating.

The carbon molecular sieves of the invention are hydrophobic rather than hydrophilic and thus do not preferentially absorb water which may be present in natural gas.

The shaped polymeric material will shrink during the carbonization step in a proportional manner along each dimension. The amount of shrinkage is also proportional to the amount of weight loss caused by the driving off of the hydrogen halide from the shaped polymer. A shaped pellet will lose approximately 70 percent of its weight and size during the carbonization procedure due to the evolution of hydrogen chloride, hydrogen bromide, or hydrogen fluoride or a mixture of these gases. For PVDC-based precursors, the final carbonized material will often equal about 25 to 28 weight percent of the initial or starting polymerized material. The density of the initial material and the final carbonized material are related. That is, the density measured in terms of grams per mL of the finished carbon molecular sieves is dependent on the density of the initial uncarbonized polymer and the carbonization process conditions.

Once the polymer has been carbonized, the carbon molecular sieves may be used directly for storing gases. Alternatively, it may be desirable to adjust the pore size to improve the adsorptive capacity. This may be done by reacting carbon with gases such as steam, $CO_2$, or $O_2$ to increasing the pore size, or depositing carbon from hydrocarbons to decrease the pore size.

Natural Gas Storage

An important potential use for natural gas is as a fuel for vehicles. It will be evident that the size and weight of the fuel tanks for such vehicles will be an important consideration. The tanks must hold enough natural gas to provide an acceptable operating range and still not occupy too much space or add too much weight to the vehicle. The size of conventional gasoline tanks provide a target configuration which is difficult to match when natural gas is the fuel. Liquified natural gas occupies the least space, but requires a temperature of about $-162°$ C., which is too low to be considered for most applications. High pressure natural gas, say in the range of 2000 psig (13.9 mPa) to 3600 psig (25 mPa), is feasible but the high pressures require heavy and expensive vessels which can be fueled only from rather expensive equipment. It is unlikely that such high pressure would be acceptable or feasible except for a captive fleet of short range vehicles which could be fueled at a central location. Lower pressures of about 300 psig (2.2 mPa) to 900 psig (6.3 mPa) are considered to present an optimal choice for natural gas fueled vehicles.

It has been shown that adsorbents may be useful for low pressure storage of natural gas and carbons have been found to have higher capacities for natural gas than other solid adsorbents such as zeolites, silica gel, and alumina. Even so, not all carbons have adequate capacity to meet the standards considered necessary for practical applications. As will be seen, the preferred carbon molecular sieves previously described are superior to others and provide a higher capacity for natural gas. Another advantage for carbon compared to other adsorbents is its lower tendency to adsorb impurities in the natural gas which could decrease the storage capacity for the natural gas. Since the carbon molecular sieves typically are hydrophobic they avoid loss of capacity resulting from adsorption of water as well as adsorption of $CO_2$ or other impurities.

Natural gas will be stored in the pores of the carbon and in spaces around the carbon particles. The optimum pore size for natural gas adsorption is believed to be about 4 to 15 Å (0.4 to 1.5 nm) since the pores do not just hold compressed gas, but cause the gas molecules to behave as if more highly compressed, that is, to have a higher density than the gas normally has the storage pressure. Thus, it follows that the volume of such micropores should be as large as possible to maximize gas storage. Gas in the spaces around the carbon would be expected to have its normal density and therefore, these spaces should be minimized, that is, the carbon should have the highest possible packing density. Another factor to be considered is the need to provide for access to the carbon so that the natural gas can be efficiently stored and recovered. For that purpose larger pores are believed to be needed, say about 20 to 500 Å (2 to 50 nm). These have been termed meso pores. Larger pores, i.e. above 500 Å (50 nm) are considered macro pores.

EXAMPLE 1

A carbon molecular sieve was made by suspension polymerization using only vinylidene chloride (VDC). 140.6 g of commercial grade VDC (PPG Industries, Inc.) were passed through 40 mL of PCB activated carbon to remove the inhibitor content. Then 0.141 g of azobisisobutytonitrile (AIBN) was dissolved in the VDC. The VDC was then slowly added to 703.03 g of an aqueous solution containing 0.6% hydropropyl methyl cellulose and agitation of a 1000 mL Parr reactor was begun at 10-100 rpm. The vessel containing the mixture was held in a constant temperature bath at 70° C. for about 8 hours, to complete the polymerization of VDC. The polymer was produced as beads of about 2 mm diameter. These were recovered, washed with water, and dried at 100° C. The VDC polymer was ground to about 100 μm and then pressed into cylindrical pellets of about 3.2 mm diameter and 3.2 mm height. The pellets were placed in a quartz tube in a tube furnace and heated with a programmed schedule. A steady stream of nitrogen was introduced for a least 30 minutes before heating began. Then, the temperature was increased from 25° to 175° C. in 30 minutes to 2 hours and held for 2-4 hours. It was then raised at a rate of 100° C. per hour to 700° C. and held for 2 hours before cooling to room temperature.

EXAMPLE 2

In testing of adsorbent particles the packing density was determined by the following method. The individual density of the particles was measured by weighing a particle and then dividing that weight by the volume of the particle. Assuming the density of the carbon itself is 2.2 g/mL, total pore volume was calculated. The packing density was measured by placing about 10-30 grams of the particles in a 50 mL graduated cylinder and vibrating the cylinder with an electric vibrator (60 cycles/sec) until a constant volume was obtained. The interparticle void volume was then calculated, knowing the particle density and the packing density. The volume of the micropores was measured with Micromeritics ASAP 2000 micropore equipment using methane adsorption at 87.3° K. The pore size distribution was analyzed with a Horvath-Kawazoe method. It was found that the micropores were generally in the region of 5-7 Å (0.5-0.7 nm). Using this information the volume of the pores in the meso pore range and of larger size were calculated. Photo micrographs have shown that the micro pores are very uniform and elongated in a slit-like configuration.

Two sizes of particles were used in the following tests. The large particles of about 2 mm size were prepared as in Example 1 by pelletizing powdered polymer. The smaller particles were made by carbonizing small particles of polymer as made in Example 1 which are approximately spherical shaped beads. The larger particles were packed into a 40 mL container using an electrical vibrator (60 cycles/sec) until the maximum packing density was obtained. The smaller particles were added to the larger particles using the electrical vibration until no more could be added. It was found that the density of the mixed particle bed was greater than that obtained for either size alone. Data from several experiments are shown in the following table.

TABLE 1

| Sample # | Large Granular Adsorbent (Pellets) | | | Small Granular Adsorbent (Beads) | | | Final Packing Density |
|---|---|---|---|---|---|---|---|
| | Size | Packing Density | wt. % in the Mixture | Size | Packing Density | wt. % in the Mixture | |
| A | 2290μ | 0.547 g/mL | 78.1 | 180-300μ | 0.508 g/mL | 21.9 | 0.672 g/mL |
| B | 2290 | 0.524 | 74.4 | 210-300 | 0.510 | 25.6 | 0.639 |
| C | 2290 | 0.527 | 78.6 | 180-300 | 0.526 | 21.4 | 0.671 |
| C | 2290 | 0.570 | 79.9 | 180-300 | 0.526 | 20.1 | 0.710 |
| E | 1680 | 0.541 | 79.8 | 180-210 | 0.526 | 20.2 | 0.679 |

EXAMPLE 3

Measurement of the methane capacity of the carbon particles was carried out in stainless steel containers having volumes of 40 mL. A comparison was made between single size pellets and mixed-size particles of the invention. The pellets and particles were packed into the container using an electric vibrator to obtain the maximum packing density. The container was evacuated to 1 m torr (0.001 mm Hg) and heated to 175° C. for 4 hours. The weight of the container and contents was measured and then methane gas was introduced at various pressures. The temperature was measured by a thermocouple placed in the center of the bed of pellets. After equilibrium was reached, the container was weighed again and the total methane uptake determined. This includes methane in the micropores, the meso and macro pores, and the void space between pellets. The effective volumetric capacity of the absorbent ($\Delta$ v/v) was determined as the difference between the v/v at absorption pressure and the v/v at delivery pressure. The v/v at any pressure is determined by the formula:

$$v/v = g.CH_4 \text{ adsorbed} \div 0.000643 \text{ g/mL} \div \text{cell volume}$$

where 0.000643 g/mL is the density of $CH_4$ at delivery conditions [29.40 in (746.7 mm) Hg, 26.3° C.] The results are given in the following table.

TABLE 2

| Sample | F | G | H | I |
|---|---|---|---|---|
| Absorbent | 2.3 mm Pellets | 2.3 mm Pellet/Beads | 1.6 mm Pellet | 1.6 mm Pellet/Beads |
| Packed Cell volume, mL | 39.89 | 39.89 | 39.60 | 39.60 |
| Pellets wt (g) | 21.08 | 21.02 | 21.41 | 21.44 |
| Beads wt (g) | — | 5.74 | — | 5.43 |
| Total dry wt (g) | 20.72 | 26.23 | 21.05 | 26.33 |
| Packing density (g/mL) | 0.519 | 0.658 | 0.532 | 0.665 |
| $CH_4$ adsorbed (g) | | | | |
| 0 psig | 0.65 | 0.77 | 0.61 | 0.79 |
| 100 | 2.12 | 2.64 | 2.14 | 2.62 |
| 200 | 2.78 | 3.43 | 2.82 | 3.38 |
| 300 | 3.28 | 3.89 | 3.29 | 3.88 |
| 400 | 3.61 | 4.22 | 3.63 | 4.24 |
| 500 | 3.88 | 4.54 | 3.89 | 4.56 |
| 600 | 4.12 | 4.79 | 4.13 | 4.80 |
| 700 | 4.32 | 4.95 | 4.37 | 4.99 |
| 800 | 4.51 | 5.16 | 4.53 | 5.16 |
| 900 | 4.68 | 5.32 | 4.70 | 5.32 |
| $\Delta$ (v/v) 0 psig | 0 | 0 | 0 | 0 |
| 100 | 57.33 | 72.92 | 60.11 | 71.89 |
| 200 | 83.06 | 103.73 | 86.82 | 101.75 |
| 300 | 102.56 | 121.67 | 105.28 | 121.39 |
| 400 | 115.43 | 134.54 | 118.64 | 135.53 |
| 500 | 125.96 | 147.02 | 128.85 | 148.10 |
| 600 | 135.32 | 156.77 | 138.28 | 157.53 |
| 700 | 143.12 | 163.01 | 147.71 | 164.99 |
| 800 | 150.53 | 171.20 | 153.99 | 171.69 |
| 900 | 157.16 | 177.44 | 160.67 | 177.96 |

It can be seen that single-size pellets (samples F and H) adsorbed less methane at each pressure than the mixed particles (G and I). This would result from the greater weight of carbon which has been packed into the 40 mL container. Thus the effective delivered volume of methane relative to the volume of the container is substantially improved.

A generally accepted target value for $\Delta$ v/v is 150, which is considered necessary for commercial success in storage of natural gas for vehicular use. The results in Table 2 show that this value can be achieved with a storage pressure of about 500–600 psig (3,548–4,237 kPa gauge) using the packing method of the invention and the preferred carbon molecular sieve adsorbent.

I claim:

1. A method of increasing the packing density of particulate adsorbents in a bed of such particles comprising combining two uniform size particles having nominal diameters differing by a ratio of about 7/1, the larger particle being a pellet having a diameter/height ratio of about 1/1 and the smaller particle being a sphere.

2. The method of claim 1 wherein two sizes of particles are used, the larger particle having a nominal diameter of about 0.4 to 4 mm and the smaller particle having a nominal diameter of about 0.04 to 0.4 mm.

3. The method of claim 2 wherein the larger particle is about 80% of the total absorbent weight.

4. The method of claim 1 wherein said adsorbent particles are a carbon molecular sieve.

5. The method of claim 3 wherein said carbon molecular sieve is the product of carbonization of a polymer of vinylidene chloride.

6. A packed bed of adsorbent particles consisting essentially of two particle sizes having nominal diameters differing by a ratio of about 7/1, the larger particle being a pellet having a diameter/height ratio of about 1/1, and the smaller particle being a sphere.

7. A packed bed of claim 6 wherein two sizes of particles are used, the larger particle having a nominal diameter of about 0.4 to 4 mm and the smaller particle having a nominal diameter of about 0.04 to 0.4 mm.

8. A packed bed of claim 7 wherein the larger particle is about 80% of the total absorbent weight.

9. A packed bed of claim 6 wherein said particulate adsorbent is a carbon molecular sieve.

10. A packed bed of claim 9 wherein said carbon molecular sieve is derived from carbonization of a polymer of vinylidene chloride.

* * * * *